United States Patent [19]

Goldmann

[11] 4,402,667

[45] Sep. 6, 1983

[54] PROCESS AND AN INSTALLATION FOR THE HEAT-TREATMENT OF FINE-GRAINED MATERIAL

[75] Inventor: Wolf Goldmann, Beckum, Fed. Rep. of Germany

[73] Assignee: Krupp Polysius AG, Beckum, Fed. Rep. of Germany

[21] Appl. No.: 213,496

[22] Filed: Dec. 5, 1980

[30] Foreign Application Priority Data

Jan. 8, 1980 [DE] Fed. Rep. of Germany ....... 3000494

[51] Int. Cl.³ .......................... F27B 15/06; F27B 7/02; C04B 7/02
[52] U.S. Cl. ..................................... 432/14; 106/100; 432/106
[58] Field of Search .................. 432/14, 106; 106/100

[56] References Cited

U.S. PATENT DOCUMENTS

| | | | |
|---|---|---|---|
| 3,986,818 | 10/1976 | Deussner et al. | 432/14 |
| 4,257,766 | 3/1981 | Ritzmann et al. | 432/14 |
| 4,300,879 | 11/1981 | Goldmann et al. | 432/14 |

*Primary Examiner*—John J. Camby
*Attorney, Agent, or Firm*—Learman & McCulloch

[57] ABSTRACT

The invention relates to a process and an installation for the heat-treatment of fine-grained material. Before the material is introduced into a precalcination zone, waste air from a cooling zone is divided into two component streams into which partial quantities of material coming from the two preheating zones are introduced. Separately measurable quantities of fuel are added to these two component streams before they are combined with one another. In this way, the material is maximally deacidified in the precalcination zone before it is introduced into the calcining zone without any danger of deposits being formed in the precalcination zone.

12 Claims, 3 Drawing Figures

PROCESS AND AN INSTALLATION FOR THE HEAT-TREATMENT OF FINE-GRAINED MATERIAL

This invention relates to a process and an installation for the heat-treatment of fine-grained material, particularly cement raw mix using a calcining zone, a first preheating zone through which the waste gases from the calcining zone flow, a cooling zone, a precalcination zone through which waste air from the cooling zone flows and which is supplied with additional fuel and a second preheating zone through which the waste gases from the precalcination zone flow, partial quantities of the material being delivered to each of the two preheating zones and the entire preheated material subsequently being introduced into the precalcination zone.

Processes of the type mentioned above are known for example from German Offenlegungsschrifts Nos. 24 20 322 and 24 51 115. In this case, the two preheating zones are each formed by a multiple-stage cyclone preheater, the partial quantities of material preheated in the two preheating zones being combined with one another before their introduction into the precalcination zone.

In this known process, a considerable proportion of dust-like material which has already been completely de-acidified is also always returned to the preheating zone heated by waste gas from the calcining zone (rotary-kiln waste gas). Accordingly, that partial quantity of material which passes into the precalcination zone from the preheating zone supplied with kiln waste gas is characterised throughout by a higher degree of de-acidification than the partial quantity of material from the other preheating zone. To avoid over-calcining of the material in the precalcination zone and caking attributable thereto, it is not possible—in view of these differences in the degree of de-acidification of the preheated material—to introduce as much fuel into the precalcination zone as is basically desirable to obtain complete de-acidification of the partial quantity of material coming from the preheating zone supplied with air from the cooling zone.

Accordingly, the object of the present invention is to obviate this disadvantage by carrying out a process of the type mentioned at the beginning in such a way that the material is de-acidified as far as possible in the precalcination zone without any danger of troublesome deposits being formed.

According to the invention, this object is achieved by combination of the following features:
(a) before it is introduced into the precalcination zone, the waste air from the cooling zone is divided into two component streams into which the partial quantities of material coming from the two preheating zones are introduced;
(b) separately measurable quantities of fuel are added to these two component streams, each consisting of preheated material and waste air from the cooling zone, before they are combined with one another.

In the process according to the invention, therefore, the streams of material coming from the two preheating zones are already partly de-acidified before they are combined with one another in the main part of the precalcination zone. The separately measurable addition of fuel to the two component streams of the preheated material enables the quantity of fuel added to be adapted to the different degree of de-acidification of the material of both component streams. In this way, it is possible—in particular by reducing the addition of fuel to the component stream preheated by the waste kiln gases—to take into account the higher degree of de-acidification of this component stream attributable to the returned kiln dust.

Accordingly, it is possible by virtue of the process according to the invention to obtain maximal de-acidification of the material in the precalcination zone before it is introduced into the calcining zone without any danger of deposits being formed in the precalcination zone.

Another advantage of the process according to the invention is that the quantities of gas in the two preheating zones can be adjusted independently of one another by means of separate fans and hence optimally adapted to the operating conditions prevailing in the calcining zone and in the cooling zone. The use of a two-zone preheater also provides for a reduction in overall height. Finally, it is an advantage in terms of process technology that precalcination takes place with air of normal oxygen content which promotes complete de-acidification of the material.

One embodiment of an installation for carrying out the process according to the invention is illustrated in the accompanying drawings wherein.

Figure 1:
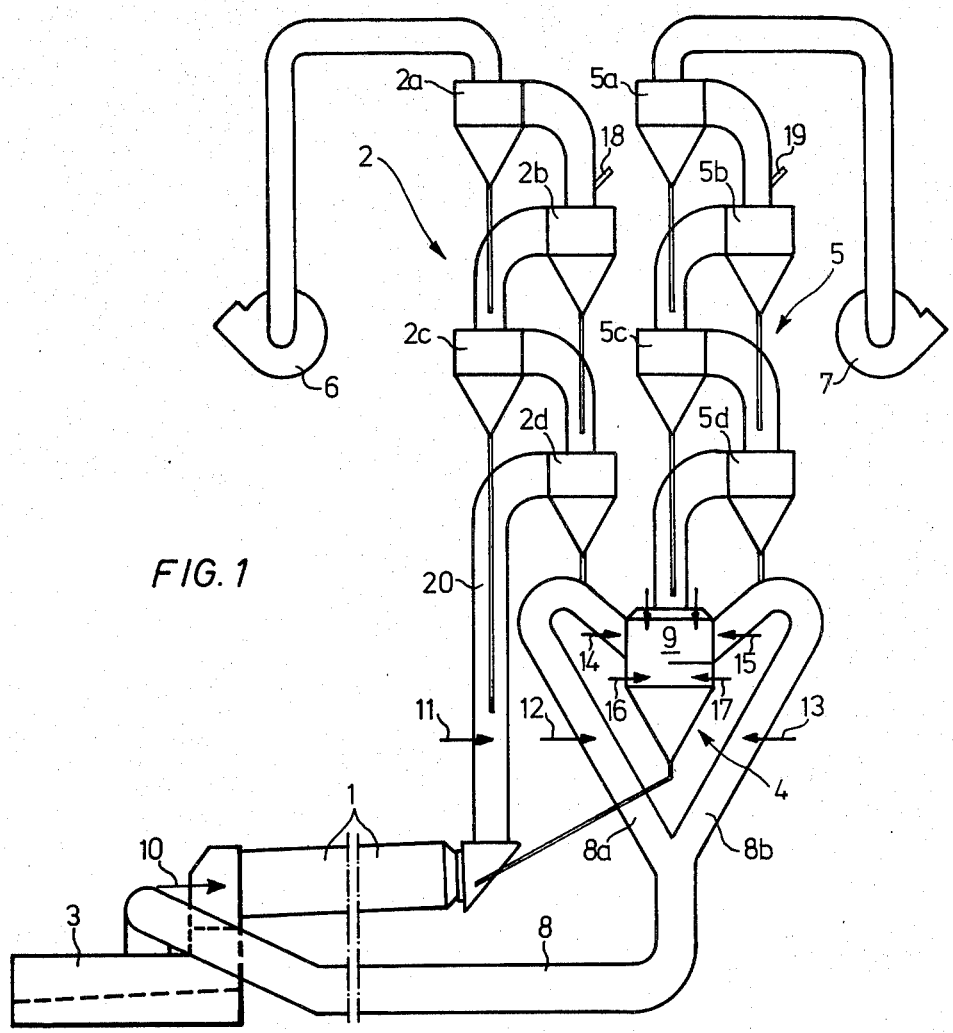
FIG. 1 is an elevational, diagrammatic view of the apparatus.

The installation shown in FIG. 1 comprises a rotary kiln 1 which forms the calcining zone, a cyclone preheater 2 through which the waste gases from the rotary kiln 1 flow and which forms the first preheating zone, a cooling zone 3, a precalcination zone 4 through which waste air from the cooling zone flows and which is supplied with additional fuel and a cyclone preheater 5 which forms the second preheating zone and through which the waste gases from the precalcination zone 4 flow.

Separate fans 6 and 7 are associated with the two cyclone preheaters 2 and 5. The two cyclone preheaters 2 and 5 each consist of four cyclones 2a to 2d and 5a to 5d.

Figure 2:
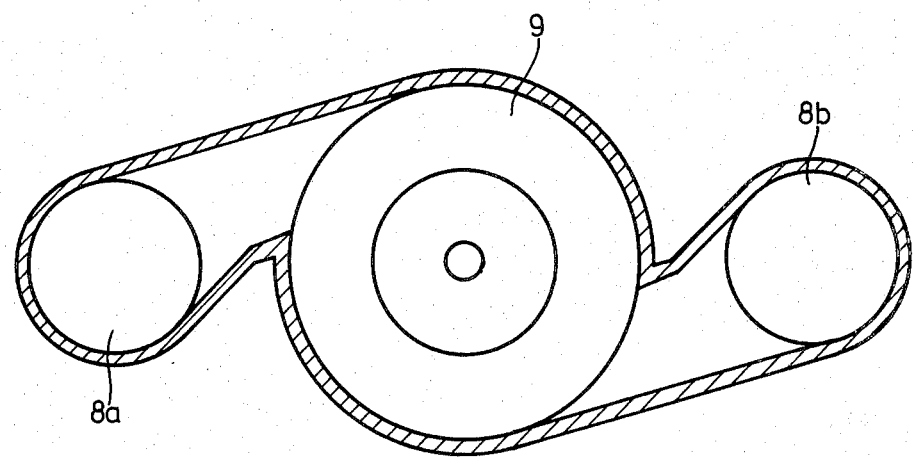
FIG. 2 is an enlarged, sectional view taken on the line II—II of FIG. 1.

A pipe 8 leads from the cooling zone 3 to the precalcination zone 4. It divides into two pipes 8a and 8b which open diametrically tangentially from opposite sides, preferably diametrically opposite one another, into a cyclone 9 provided with two gas inlets (cf. FIG. 2).

The following inlets are provided for fuel: at 10 in the rotary kiln 1, at 11 in the gas pipe leading from the rotary kiln 1 to to cyclone preheater 2, at 12 and 13 in the pipes 8a and 8b leading from the cooling zone 3 to the precalcination zone 4, at 14 and 15 in the vicinity of the opening of the pipes 8a to 8b into the cyclone 9 and finally at 16 and 17 in the lower part of the cyclone 9.

The material is delivered to the cyclone preheaters 2 and 5 in two partial quantities at 18 and 19 and then flows through the four stages of these two cyclone preheaters in known manner in countercurrent to the hot gases. The material discharged from the cyclone 2c and introduced into the riser 20 of the rotary kiln 1 may be precalcined by combustion of the additional fuel introduced at 11 before entering the pipe 8a (after separation in the cyclone 2d) where it is further de-acidified by the combustion of fuel introduced at 12 before this partial quantity of material is combined with the other partial quantity in the cyclone 9. This other partial quantity of material which is preheated in the cyclone preheater 5 is precalcined in the pipe 8b—after separation in the cyclone 5d—by combustion of the fuel introduced at 13 before it enters the cyclone 9. The material is de-acidified almost completely by the combustion of fuel added at 14, 15, 16 and 17 before it enters the rotary kiln 1.

Figure 3:
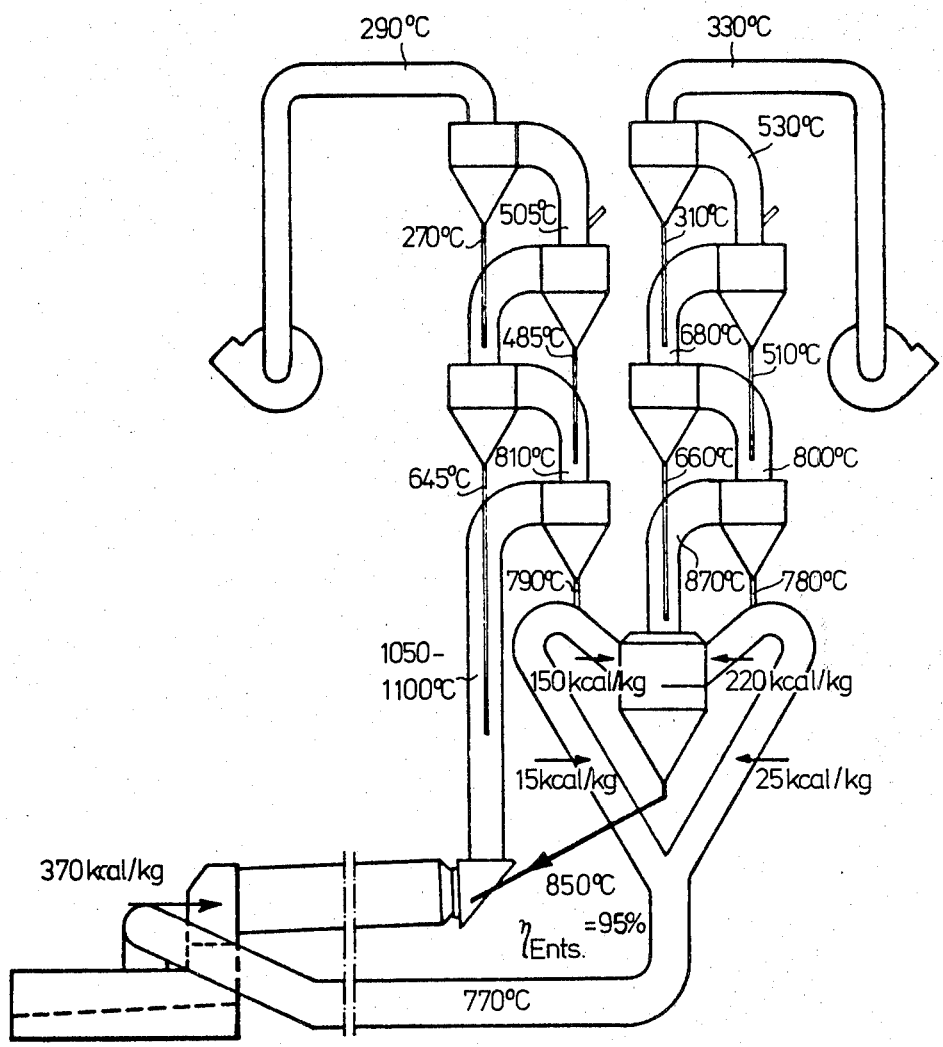
FIG. 3 is a view similar to FIG. 1 but including typical material quantities and temperatures.

FIG. 3 illustrates the operating data of an installation for calcining cement using the process according to the invention. A total of 410 kcal/kg of clinker fuel is added in the region of the precalcination zone, being made up as follows: 165 kcal/kg of clinker for that half of the material which is preheated by the waste kiln gases and 245 kcal/kg of clinker for the quantity of material which is preheated by waste air from the cooling zone. The material enters the rotary kiln from the precalcination zone with a degree of de-acidification of the order of 95%. The other material and gas temperatures are shown in FIG. 3.

I claim:

1. In a process of heat treating fine-grained material such as raw cement metal wherein first and second partial quantities of such material are passed to first and second preheating zones, respectively, then delivered to and combined in a precalcining zone in which fuel is combusted, then discharged to a calcining zone, and thence delivered to a cooling zone, and wherein exhaust gases from said calcining zone are delivered to one of said preheating zones, and gases from said cooling zone are delivered to said precalcining zone and thence to the other of said preheating zones, the improvement comprising dividing the gases from said cooling zone into two streams prior to the delivery thereof to said precalcining zone; introducing the partial quantity of material from said one of said preheating zones into one of said streams and the partial quantity of material from said other of said preheating zones into the other of said streams; and introducing a quantity of fuel into each of said streams, the introduction of the partial quantities of material and the fuel to the respective streams occurring prior to the combining of said partial quantities of material in said precalcining zone.

2. The process according to claim 1 including separately measuring the fuel introduced into each of said streams.

3. The process according to claim 1 wherein the quantity of fuel introduced to said streams is different.

4. The process according to claim 3 wherein the greater quantity of fuel is introduced to said other of said streams.

5. The process according to claim 1 wherein said precalcining zone comprises a cyclone, and including introducing said streams and partial quantities of material into said cyclone substantially tangentially thereof.

6. The process according to claim 5 including introducing said streams and said partial quantities of material into said cyclone at substantially diametrically opposed points.

7. Apparatus for heat treating fine-grained material such as raw cement meal comprising first and second preheaters; means for delivering a first quantity of such material to one of said preheaters and a second quantity of such material to the other of said preheaters; a precalciner for precalcining both of said quantities of material; a calcining kiln; means for delivering precalcined material from said precalciner to said kiln; a cooler; means for delivering calcined material from said kiln to said cooler; means for delivering exhaust gases from said kiln to one of said preheaters; means for delivering gases from said precalciner to the other of said preheaters; first duct means for delivering gases from said cooler to said precalciner; second duct means for delivering gases from said cooler to said precalciner; means for delivering preheated material from one of said preheaters to one of said duct means; means for delivering preheated material from the other of said preheaters to the other of said duct means; and means for introducing fuel into each of said first and second duct means between said cooler and said precalciner.

8. Apparatus according to claim 7 wherein said precalciner comprises a cyclone.

9. Apparatus according to claim 7 wherein each of said duct means communicates with said precalciner substantially tangentially thereof.

10. Apparatus according to claim 9 wherein said duct means are substantially diametrically opposed from one another.

11. Apparatus according to claim 7 wherein the quantity of fuel introduced to said first and second duct means is different.

12. Apparatus according to claim 11 wherein the greater quantity of fuel is introduced to that duct means which receives material from that preheater into which gases from said precalciner are delivered.

* * * * *